US006451421B1

(12) United States Patent
Robertson et al.

(10) Patent No.: US 6,451,421 B1
(45) Date of Patent: Sep. 17, 2002

(54) LASER MARKABLE MICRO-PORE ALUMINUM TAGS AND METHOD OF THEIR FABRICATION

(75) Inventors: John A. Robertson, Chillicothe, OH (US); Edward S. O'Neal, Rockbridge, OH (US); Ken R. Vaughn, Kingston, OH (US); Christopher D. Speakman, Greenfield, OH (US)

(73) Assignee: Infosight Corporation, Chillicothe, OH (US)

( * ) Notice: Subject to any disclaimer, the term of this patent is extended or adjusted under 35 U.S.C. 154(b) by 44 days.

(21) Appl. No.: 09/811,274

(22) Filed: Mar. 19, 2001

(51) Int. Cl.[7] .................................................. B32B 3/00

(52) U.S. Cl. ............................... 428/315.5; 428/305.5; 428/306.6; 428/312.2; 428/312.8; 428/307.3; 283/70; 283/74; 427/387; 427/510; 427/515; 427/554; 427/555; 427/556

(58) Field of Search .................. 283/70, 74; 428/305.5, 428/306.6, 307.3, 312.2, 312.8, 315.5; 205/171, 172, 173; 427/554, 555, 556, 510, 515, 387

(56) References Cited

U.S. PATENT DOCUMENTS 3,615,553 A * 10/1971 Wainer ........................ 430/526
3,664,888 A * 5/1972 Oga et al. .................... 148/272
3,975,197 A * 8/1976 Mikelsons .................. 101/456
4,873,298 A * 10/1989 Ryntz ......................... 525/477
5,422,167 A * 6/1995 Robertson et al. .......... 428/195
5,484,099 A * 1/1996 Robertson et al. ....... 219/117.1
5,714,234 A * 2/1998 Robertson ................... 427/289
5,855,969 A * 1/1999 Robertson ................... 427/387
6,001,481 A * 12/1999 Dearnaley et al. ....... 428/312.2
6,063,458 A * 5/2000 Robertson et al. ......... 219/76.1

FOREIGN PATENT DOCUMENTS

JP 07204871 * 8/1995

* cited by examiner

*Primary Examiner*—Elizabeth M. Cole
*Assistant Examiner*—Leanna Roché
(74) *Attorney, Agent, or Firm*—Mueller and Smith, LPA

(57) ABSTRACT

An anodized micro-pore aluminum tag bearing indicia thereon wherein the micro-pore anodized aluminum has its micro-pores filled with the cured reside of a composition, which contains silicone resin having pendant groups selected from one or more of methyl groups or phenyl groups. The composition in the micro-pores was cured to a degree effective for marking by blackening thereof with a, e.g., $CO_2$, laser beam, in the form of indicia thereon. The surface of the tag preferably is substantially free of said composition. The method for treating the surface of the anodized micro-pore aluminum tag for forming indicia thereon commences by applying the composition to the surface. Excess of the composition from the surface is removed to leave composition resident in said micro-pores. The composition in the micro-pores then is at least partially cured. A laser then can create the indicia by blackening the composition in the micro-pores.

13 Claims, 2 Drawing Sheets

LASER MARKABLE MICRO-PORE ALUMINUM TAGS AND METHOD OF THEIR FABRICATION

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention relates to the marking of metal, e.g., for tracking and identification purposes, and more particularly to imprinted anodized aluminum metal tags which can be attached to metal workpieces, e.g., by welding.

A variety of finished goods (e.g., automobile mechanical parts, aerospace parts, etc.) require marking for identification purposes. Such goods may be at or below room temperature when the marking requirement arises. Such goods also may be raw or partly finished and at high temperatures, say, up to 1,100° F., in the case of aluminum. Marking of these goods for identification purposes also is required.

In the case of aluminum goods or aluminum tags for attachment to raw, partly finished, and finished goods, the marking of aluminum presents a particularly difficult task because conventional coatings are vulnerable to abrasion. Abrasion resistance of coatings on aluminum relies on the strength of the bond of the coating to the aluminum substrate. Examples of coatings that suffer from good abrasion resistance can be found in U.S. Pat. Nos. 4,873,298 (polysiloxane graft copolymers) and U.S. Pat. No. 3,975,197 (lithographic aluminum plates with a coating of particulate material bound by an aluminum hydroxyoxide coating).

The rapid oxidation of aluminum also creates many problems in obtaining proper adhesion levels of coatings on aluminum substrates. Methods of preparing the surface of aluminum substrates, such as by oxidizing, has been proposed in U.S. Pat. No. 3,664,888. Still, the coated aluminum surface may be compromised even by abrasion testing, for example, with a Taber Abraser. Taber abrasion resistance measures the resistance of a coating applied to a surface, such as metal, to abrasion. The coated surface is subjected to abrasion by rotating the coated panel against weighted abrasive wheels.

In the lithography photographic plate art, there exists an anodized aluminum substrate (aluminum oxide layer formed on the surface of the aluminum by anodic oxidation, *J. Elec. Chem. Society*, 100, (9), 411), whose surface contains micro-pores. Photosensitive photographic emulsions have been applied to the anodized aluminum plates so that the emulsions become entrapped in the micro-pores (see U.S. Pat. No. 3,615,553). The coated plates then are photographically exposed and wet developed to produce indicia. The aluminum oxide high points are said to surround each exposed micro-pore cavity to protect the exposed indicia. A drawback to such process is the need for photographic exposure to create latent indicia with subsequent wet chemical development to make the indicia visible to the human eye. Tags for on-site marking and identification purposes could not be made practically by such a technique.

BRIEF SUMMARY OF THE INVENTION

One method of preparing a micro-pore aluminum substrate to make it act as a suitable receptor for the impregnating resin is anodizing. Thus, for example, aluminum stock may be anodized in a solution of oxalic acid and oxalates of alkali metals, under controlled pH, current, and temperature, so that the resulting anodized surface is hard, adherent, and is absorbent for soaking up resins and other liquids. Whatever electrolytic solution and anodizing process is used, it generally should be continued for a time sufficient to yield an anodized layer of hard aluminum oxide to a minimum thickness of 0.0002 inches and preferably up to a thickness of 0.05 inches. After the aluminum surface has been initially oxidized, it can then be subjected to one or more powerful oxidizing solutions such as, for example, chromic acid, or solutions of alkali ferricyanides, dichromates, or chromates, which ensure that no metallic aluminum is exposed at the base of the pores prior to them being impregnated with resin. It is critical that this secondary oxidation or "sealing" step be limited only to the base of the pore and not the entire pore. Over-oxidation seals the entire pore, which results in there being little or no space (volume) for the resin to be absorbed.

After washing and drying this double-oxidized surface, the plate bearing the prepared oxidized aluminum surface then can be impregnated with an alkyl silicone resin. The resulting pore diameter is especially critical, because it must be at least as wide or wider than the smallest particle of resin or other liquid being absorbed. If the pores produced during anodization are too small or the resin does not wet into the cavities, the resin will not penetrate the surface of the aluminum substrate and ultimately, little or no mark indicia will be produced. Polymethyl-type silicone resins are preferred, because once they are properly cured, they produce permanent black markings when subjected to a focused $CO_2$ laser beam. To improve abrasion resistance of the laser marked indicia, excess resin must be removed from the surface of the anodized aluminum before curing, so that the resin, and thus, the marked indicia are only contained within the pores where they are protected by the hard outer layer of aluminum oxide formed during anodization.

The invention, then, is an anodized micro-pore aluminum tag bearing indicia thereon wherein the micro-pore anodized aluminum has its micro-pores filled with the cured resin of a composition, which contains silicone resin having pendant groups selected from one or more of methyl groups or phenyl groups. The composition in the micro-pores was cured to a degree effective for its blackening thereof in the form of a pattern of indicia with a, e.g., $CO_2$, laser beam for marking the tag with indicia as taught in U.S. Pat. No. 5,855,969. The aluminum tag has a surface, which bears the micro-pores, and this surface is substantially free or devoid of said composition, i.e., the composition is present substantially only in the micro-pores.

The method for treating the surface of the anodized micro-pore aluminum tag for forming indicia thereon commences by applying the composition to the surface. Excess of the composition from the surface is removed to leave composition resident in said micro-pores. The composition in the micro-pores then is at least partially cured. A laser then can create the indicia by blackening the composition in the micro-pores.

This removal step of the process desirably includes a first mechanical removal with a blade, i.e., squeegee. Organic solvent for the composition (e.g., ethyl acetate) then can be poured onto the surface and a pool of the solvent squeegeed across the surface to remove the composition from the surface leaving the micro-pores filled with the composition. As a second step, the surface can be rinsed with additional solvent to even out anomalies in the composition in the micro-pores. The composition in the micro-pores then must be cured, at least partially, by heat. A laser can then create the indicia by blackening the composition in the micro-pores.

Advantages of the present invention include the ability to readily laser mark aluminum stock for manufacturing tags without further development. Another advantage includes the ability for form robust indicia recalcitrant to removal by abrasion. Yet another advantage is the ability to form aluminum tags using a rugged $CO_2$ laser. These and other advantages will be readily apparent to those skilled in the art based upon the disclosure set forth herein.

BRIEF DESCRIPTION OF THE DRAWINGS

For a fuller understanding of the nature and advantages of the present invention, reference should be had to the following detailed description taken in connection with the accompanying drawings, in which.

The drawings will be described in further detail below.

DETAILED DESCRIPTION OF THE INVENTION

The anodized micro-pore aluminum stock is described in the references set forth above. Rather than relying on conventional wet developing techniques typical of the photography or lithography industry for forming indicia on such stock, the present invention relies on a "dry", i.e., non-wet, technique. In this regard, the inventive Al tags are to be used for tracking and identification purposes. Such purposes can range from raw and/or partly prepared goods to finished goods. Regardless of the state of manufacture of the goods to be marked with the inventive tags, the present invention enables aluminum tags to be manufactured for use in identification and/or tracking of such goods.

Figure 5:
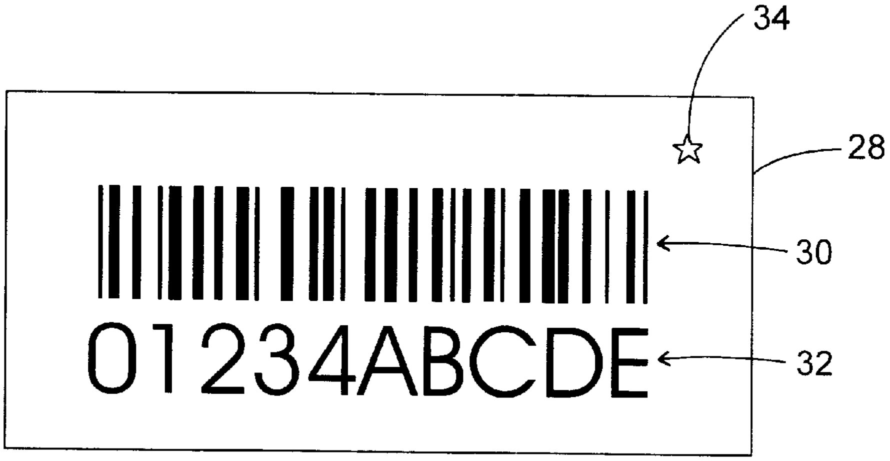
FIG. 5 is on overhead plan view of the substrate of FIG. 3 showing the resulting indicia created by the laser marking system.

Also, because the inventive tags are destined for tracking and/or identification purposes, they often are subject to rough and physical handling. This means that the indicia on the tags likewise needs to be rugged so that the indicia is not abraded, scraped away, or otherwise removed/obliterated with consequent loss of the information, such as is illustrated in FIG. 5. For present purposes, "identification" includes information, decoration, and any other purpose for which an indicia is placed upon a product in its raw, partially prepared, or final state. In this regard, "indicia" marked on the tags includes alphanumeric symbols, 32, graphical symbols, 34, and the like. Such indicia may contain the chemistry or other information about the goods being identified, may contain a serial number to track the goods, or may contain a corporate logotype and trademark to advertise/identify the goods. Bar codes, 30, are included within such indicia as a coding means for the goods being marked.

The inventive marking scheme requires a composition, which is darkenable (e.g., blackened) by the focused $CO_2$ or other laser energy. Because many of the applications of this technology will involve the imaging of bar codes (red light absorptive or "black" bars on a white background), the composition should be highly reflective to the red light commonly used to scan such bar codes. White or red coatings, then, are preferred. For human readable characters, white backgrounds are preferred.

The coatings of choice are silicone resin coatings, such as described in "Silicone Resin Emulsions for High-Temperature Coatings", *Modern Paint and Coatings*, September 1993, Argus, Inc., Atlanta, Ga. (1993). Silicone resin binders typically are heat-cured in the presence of catalysts with typical catalysts being selected from acids, bases, and the salts of metals, for example, zinc, tin, lead, or chromium octoates. Silicone resins can be blended or chemically combined with other film-forming polymers provided that the ultimate cured phenyl-substituted silicone binder is stable at the hot metal temperatures of use of the inventive labels. Phenyl-substituted resins are well known in the art, such as represented by D. H. Solomon, *The Chemistry of Organic Film Formers*, Second Edition, Robert E. Krieger Publishing, Inc., pp 334 et seq. (1977). The disclosures of the cited references are expressly incorporated herein by reference.

Figure 1:
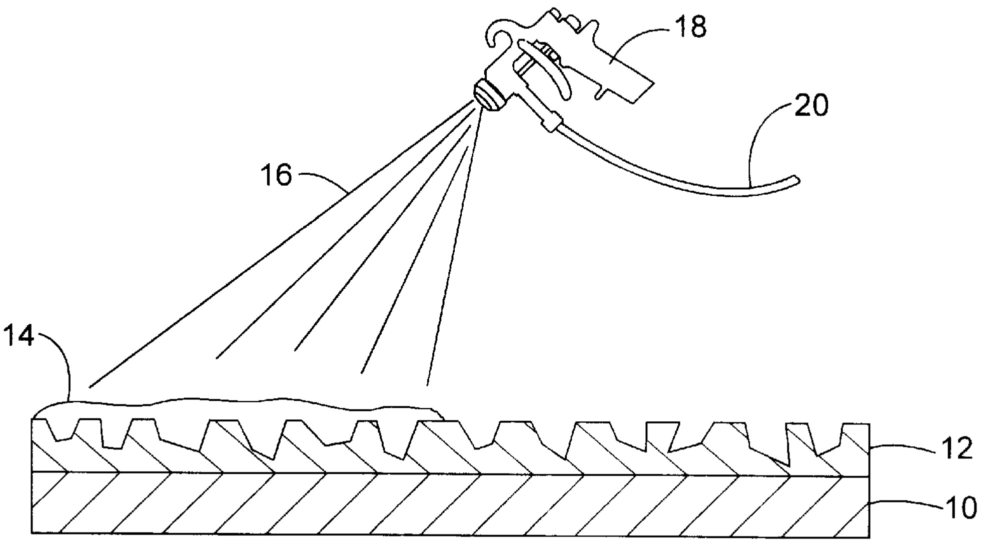
FIG. 1 is a simplified cross-sectional view of an aluminum substrate having an adherent micro-pore anodized coating, shown exaggeratedly large for purposes of illustration, with the application of a composition that contains silicone resin having pendant groups selected from one or more of methyl groups or phenyl groups and being blackenable when properly cured under the influence of a laser beam.

In order to create ruggedly marked tags, the composition first is applied to a surface of the anodized micro-pore aluminum stock. In order to obtain an even coat of the composition, application by spraying (atomization) is preferred. Alternatively, the composition could be applied by brushing, roller coating, reverse roller coating, doctor knife, coating curtain, dipping, or by any other coating technique. Such step of the process is illustrated in FIG. 1, which depicts an aluminum substrate, 10, having an anodized layer, 12, adherent thereto. The size of the micropores has been exaggerated in order to illustrate the invention. A composition, 14, is seen being applied as a spray pattern, 16, from a spray gun, 18, which draws the composition via a hose, 20, from a tank of the composition (not shown).

Figure 2:
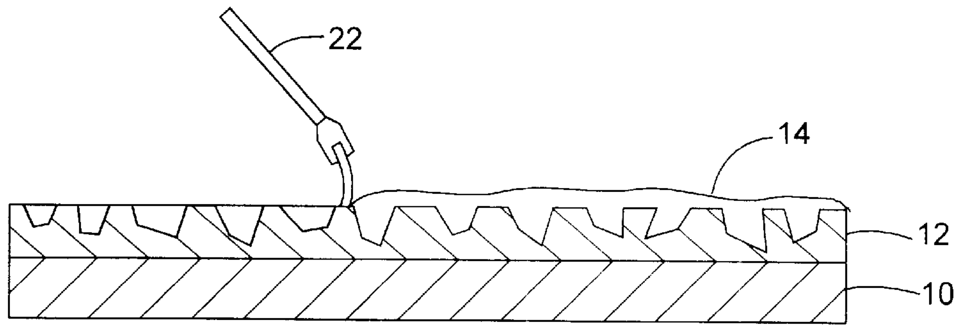
FIG. 2 is the substrate of FIG. 1 showing excess composition being removed by a squeegee to leave the composition resident in the micropores of the anodized layer.

Next, excess applied composition is removed from the surface to leave said composition resident in said micro-pores. This removal step of the process desirably includes a first mechanical removal with a blade, i.e., squeegee, 22, as shown in FIG. 2. As an optional second removal step, organic solvent for the composition (e.g., ethyl acetate) can be poured onto the surface and a pool of the solvent squeegeed across the surface to remove the composition from the surface leaving the micro-pores filled with the composition. As an optional third step, the surface can be rinsed with additional solvent to even out anomalies in the composition in the micro-pores.

Figure 3:
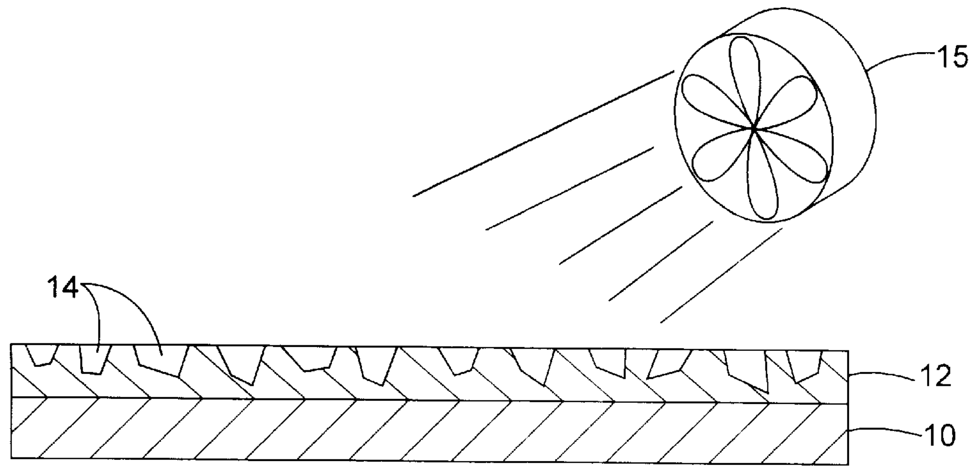
FIG. 3 is the substrate of FIG. 2 with the composition resident in the micropores being dried (i.e., at least party cured)

The last step is to at least partially cure the composition. This step can involve the simple flashing of solvent from the micro-pores to heat curing of the resin in the composition. FIG. 3 illustrates a heater, 15, radiating heat to evaporate solvent from he composition 14 in the micropores. Curing of the composition most often is accomplished by baking in an oven, e.g., set at about 300° F., for a time ranging, e.g., from about 3 to 5 minutes. After curing, the tag can be handled for storage, shipping, or the like, prior to use. The tag also is not light sensitive.

Figure 4:
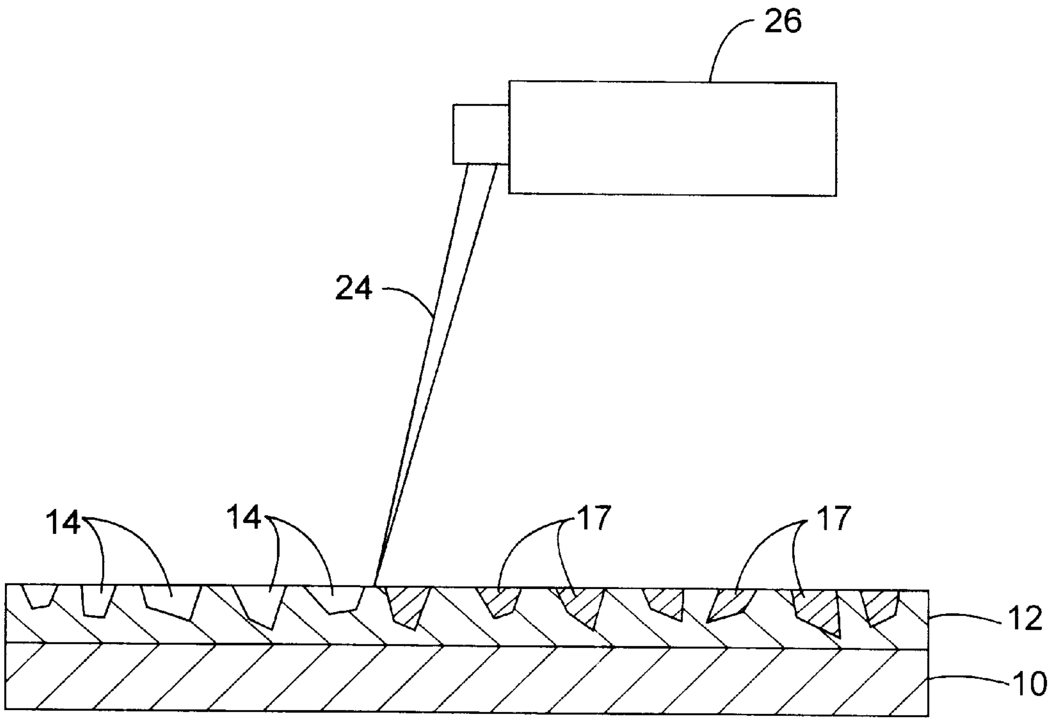
FIG. 4 is the substrate of FIG. 3 being marked by a laser marking system.

The tag now is ready to be marked by the energy of a focused laser beam, 24, emitted from a $CO_2$ laser, 26, as shown in FIG. 4, wherein blackened composition in the micropores, 17, is seen. A $CO_2$ laser is preferred for its cost effectiveness and ruggedness in industrial environments. Other lasers, however, can be used at the expense of cost and risk of eye damage in industrial environments. Marking of the tag preferably is accomplished in accordance with the raster-scanning technique disclosed in U.S. Pat. No. 5,855,969. In accordance with this technique, the tags move in the x-axis direction past a raster-scanning infrared laser beam emitting $CO_2$ laser that raster-scans in the Y-axis for forming the indicia on the tags. Scanning the laser beam through the use of two galvanometers (so-called X/Y scanning) and a flat field focusing lens also is a preferred marking method.

A tag treated and marked in accordance with the precepts of the present invention, 28, may contain a bar code, 30, alphanumeric characters, 32, or a graphic, 34, as illustrated in FIG. 5. Such tag may be affixed to a product by a wide variety of conventional and unconventional manners, including, for example, wiring through a hole, adhesive backings, and various fasteners. The tag may be affixed in the bare-area(s) welding technique disclosed in U.S. Pat. Nos. 5,422,167 and 5,484,099, by the welding pre-form technique in U.S. Pat. No. 5,714,234, or by the folded end(s) welding technique in U.S. Pat. No. 6,063,458, the disclosures of which are expressly incorporated herein by reference. In this regard, only one edge of the laser marked tag may be welded to the product leaving the opposite end free. This configuration may permit the tag to be lifted and cracked off adjacent the weld attachment. In fact, the laser marked tag even may be scored to facilitate this crack off procedure of removing the tag once its function of product identification has been satisfied.

While the invention has been described with reference to a preferred embodiment, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In this application all units are in the metric system and all amounts and percentages are by weight, unless otherwise expressly indicated. Also, all citations referred herein are expressly incorporated herein by reference.

What is claimed is:

1. An anodized micro-pore aluminum tag bearing indicia thereon, which comprises:

micro-pore anodized aluminum having its micro-pores filled with the cured resin of a composition containing silicone resin having pendant groups selected from one or more of methyl groups or phenyl groups, said composition in said micro-pores having been cured to a degree effective for blackening thereof with a laser beam in the pattern of indicia thereon.

2. The tag of claim 1, wherein said composition in said micro-pores was cured to a degree effective for marking by blackening of said composition by a $CO_2$ laser beam.

3. The tag of claim 1, which is affixed to a product for identification of the product.

4. The tag of claim 1, wherein said indicia are one or more of alphanumeric characters or graphics.

5. The tag of claim 1, wherein said aluminum tag has a surface, which bears said micro-pores, wherein said surface is substantially free of said composition.

6. A method for treating a surface of an anodized micro-pore aluminum tag having a surface for forming indicia on said surface, which comprises the steps of:

(a) applying a composition to said surface, said composition containing silicone resin having pendant groups selected from one or more of methyl groups or phenyl groups, the cured residue of said composition being blackenable with a laser beam;

(b) removing excess said composition from said surface to leave said composition resident in said micro-pores; and (c) at least partially curing said composition in said micro-pores.

7. The method of claim 6, wherein said excess composition is removed with a squeegee.

8. The method of claim 7, wherein said surface is rinsed with solvent for said composition to even out anomalies in the composition in the micro-pores.

9. The method of claim 7, wherein organic solvent for said composition is poured onto said surface and a pool of said solvent is squeegeed across said surface to remove the composition from said surface leaving said micro-pores filled with said composition.

10. The method of claim 9, wherein said surface is rinsed with solvent for said composition to even out anomalies in the composition in the micro-pores.

11. The method of claim 6, which includes the step of:

(d) directing a laser beam onto said surface to form said indicia by blackening said composition in said micro-pores.

12. The method of claim 11, wherein said laser beam is a $CO_2$ laser beam.

13. The method of claim 11, wherein said indicia formed are one or more of alphanumeric characters or graphics.

* * * * *